United States Patent
Fernandez et al.

(10) Patent No.: US 7,917,937 B1
(45) Date of Patent: Mar. 29, 2011

(54) DIGITAL TELEVISION WITH SUBSCRIBER CONFERENCE OVERLAY

(75) Inventors: Dennis S. Fernandez, Atherton, CA (US); Irene Y. Hu, Belmont, CA (US)

(73) Assignee: Dennis S. Fernandez, Atherton, CA (US)

( * ) Notice: Subject to any disclaimer, the term of this patent is extended or adjusted under 35 U.S.C. 154(b) by 827 days.

(21) Appl. No.: 11/585,393

(22) Filed: Oct. 23, 2006

Related U.S. Application Data

(60) Continuation of application No. 11/514,647, filed on Sep. 1, 2006, which is a continuation of application No. 11/507,963, filed on Aug. 21, 2006, which is a continuation of application No. 11/059,611, filed on Feb. 15, 2005, now Pat. No. 7,355,621, which is a continuation of application No. 10/444,261, filed on May 22, 2003, now Pat. No. 7,221,387, which is a continuation of application No. 10/026,095, filed on Dec. 21, 2001, now Pat. No. 6,590,602, which is a division of application No. 09/095,390, filed on Jun. 10, 1998, now Pat. No. 6,339,842.

(51) Int. Cl.
*H04N 7/173* (2006.01)

(52) U.S. Cl. ........... 725/133; 725/1; 725/34; 725/37; 725/105; 348/14.04; 348/14.07

(58) Field of Classification Search ........... 709/205, 709/230; 725/52, 53, 1, 8
See application file for complete search history.

(56) References Cited

U.S. PATENT DOCUMENTS

| | | | |
|---|---|---|---|
| 4,360,827 A | 11/1982 | Braun | |
| 4,796,293 A | 1/1989 | Blinken et al. | |
| 4,847,698 A | 7/1989 | Freeman | |
| 4,855,843 A * | 8/1989 | Ive | 386/75 |
| 4,918,516 A | 4/1990 | Freeman | |
| 5,038,211 A | 8/1991 | Hallenbeck | |
| RE34,340 E | 8/1993 | Freeman | |
| 5,243,651 A | 9/1993 | Parikh | |
| 5,371,534 A | 12/1994 | Dagdeviren et al. | |
| 5,397,133 A | 3/1995 | Penzias | |
| 5,440,449 A | 8/1995 | Scheer | |
| 5,491,797 A | 2/1996 | Thompson et al. | |
| 5,504,933 A | 4/1996 | Saito | |
| 5,515,099 A | 5/1996 | Cortjens et al. | |
| 5,532,735 A * | 7/1996 | Blahut et al. | 725/32 |
| 5,534,914 A | 7/1996 | Flohr et al. | |

(Continued)

FOREIGN PATENT DOCUMENTS

GB 2313251 A 11/1997

(Continued)

OTHER PUBLICATIONS

U.S. Appl. No. 11/514,647, filed Sep. 1, 2006, Fernandez.

(Continued)

*Primary Examiner* — Christopher Kelley
*Assistant Examiner* — Sahar A Baig
(74) *Attorney, Agent, or Firm* — Fernandez & Associates, LLP

(57) ABSTRACT

Digital television system overlays subscriber two-way communication during broadcast program delivery to create virtual audience community. Individual or group billing and advertisement is personalized per DTV receiver program viewing and/or conferencing activity. Subscriber receiver includes camera and other media I/O device for multi-way video conferencing. Participants may be added or removed dynamically during programming or conferencing.

18 Claims, 5 Drawing Sheets

U.S. PATENT DOCUMENTS

| | | | |
|---|---|---|---|
| 5,541,639 A | | 7/1996 | Takatsuki et al. |
| 5,572,248 A | * | 11/1996 | Allen et al. .................. 348/14.1 |
| 5,600,364 A | | 2/1997 | Hendricks et al. |
| 5,612,731 A | | 3/1997 | Cheon |
| 5,615,131 A | | 3/1997 | Mortensen et al. |
| 5,635,979 A | | 6/1997 | Kostreski et al. |
| 5,675,375 A | | 10/1997 | Riffee |
| 5,689,553 A | | 11/1997 | Ahuja et al. |
| 5,696,906 A | * | 12/1997 | Peters et al. ...................... 705/34 |
| 5,701,161 A | | 12/1997 | Williams et al. |
| 5,710,815 A | | 1/1998 | Ming et al. |
| 5,729,471 A | | 3/1998 | Jain et al. |
| 5,729,549 A | | 3/1998 | Kostreski et al. |
| 5,734,413 A | | 3/1998 | Lappington et al. |
| 5,775,995 A | | 7/1998 | Okamoto |
| 5,795,228 A | | 8/1998 | Trumbull et al. |
| 5,815,195 A | * | 9/1998 | Tam ................................ 725/86 |
| 5,818,513 A | | 10/1998 | Sano et al. |
| 5,823,879 A | | 10/1998 | Goldberg et al. |
| 5,828,839 A | * | 10/1998 | Moncreiff ...................... 709/204 |
| 5,880,731 A | | 3/1999 | Liles |
| 5,913,040 A | | 6/1999 | Rakavy et al. |
| 5,920,642 A | | 7/1999 | Merjanian |
| 5,966,442 A | | 10/1999 | Sachdev |
| 5,978,855 A | | 11/1999 | Metz et al. |
| 5,987,518 A | | 11/1999 | Gotwald |
| 5,999,207 A | | 12/1999 | Rodriguez et al. |
| 6,006,257 A | | 12/1999 | Slezak |
| 6,020,885 A | * | 2/2000 | Honda ........................... 715/757 |
| 6,023,499 A | | 2/2000 | Mansey et al. |
| 6,038,599 A | | 3/2000 | Black et al. |
| 6,061,399 A | | 5/2000 | Lyons |
| 6,062,981 A | | 5/2000 | Luciano, Jr. |
| 6,075,553 A | | 6/2000 | Freeman et al. |
| 6,081,830 A | * | 6/2000 | Schindler ....................... 709/204 |
| 6,084,583 A | | 7/2000 | Gerszberg et al. |
| 6,094,213 A | | 7/2000 | Mun et al. |
| 6,117,013 A | | 9/2000 | Eiba |
| 6,124,882 A | | 9/2000 | Voois et al. |
| 6,128,033 A | | 10/2000 | Friedel et al. |
| 6,133,912 A | * | 10/2000 | Montero ........................ 715/716 |
| 6,152,824 A | * | 11/2000 | Rothschild et al. .............. 463/42 |
| 6,183,364 B1 | | 2/2001 | Trovato |
| 6,205,209 B1 | | 3/2001 | Goldberg et al. |
| 6,219,086 B1 | | 4/2001 | Murata |
| 6,236,805 B1 | | 5/2001 | Sebestyn |
| 6,243,129 B1 | | 6/2001 | Deierling |
| 6,287,199 B1 | * | 9/2001 | McKeown et al. .............. 463/40 |
| 6,298,088 B1 | | 10/2001 | Bhatt et al. |
| 6,396,480 B1 | | 5/2002 | Schindler et al. |
| 6,418,214 B1 | | 7/2002 | Smythe et al. |
| 6,463,585 B1 | | 10/2002 | Hendricks et al. |
| 6,530,840 B1 | | 3/2003 | Cuomo et al. |
| 6,621,514 B1 | | 9/2003 | Hamilton |
| 6,741,833 B2 | | 5/2004 | McCormick et al. |
| 7,120,139 B1 | | 10/2006 | Kung et al. |
| 7,383,438 B2 | | 6/2008 | Fahrny et al. |
| 2002/0059581 A1 | | 5/2002 | Billock et al. |
| 2005/0198140 A1 | | 9/2005 | Itoh et al. |

FOREIGN PATENT DOCUMENTS

| | | |
|---|---|---|
| JP | 02-084177 | 12/1991 |
| JP | 403283982 | 12/1991 |
| JP | 03-143060 | 12/1992 |
| JP | 404367040 | 12/1992 |
| JP | 05-145918 | 6/1993 |
| JP | 05-091505 | 9/1993 |
| JP | 05-316107 A | 11/1993 |
| JP | 406269004 A | 9/1994 |
| JP | 05-160913 | 1/1995 |
| JP | 407023356 | 1/1995 |
| JP | 06-266553 | 5/1996 |
| JP | 08-130724 | 5/1996 |
| JP | 08-222068 | 3/1998 |
| JP | 10-065984 | 3/1998 |

OTHER PUBLICATIONS

U.S. Appl. No. 11/507,963, filed Aug. 21, 2006, Fernandez.
U.S. Appl. No. 11/059,611, filed Feb. 15, 2005, Fernandez.
U.S. Appl. No. 10/444,261, filed May 22, 2003, Fernandez.
U.S. Appl. No. 10/026,095, filed Dec. 21, 2001, Fernandez.
U.S. Appl. No. 09/095,390, filed Jun. 10, 1998, Fernandez.
Battle Forecasts Predicts 10 Most Innovative Products for 2006. <http://www.battle.org/news/96/>.
Dawson, F. "Video Perks Give Data a Sharp Image", Sep. 1997, Communication Engineering & Design <http://www.cedmagazine.com/ced/9709/9709d.htm>, 7 pages.
EURESCOM, Management of Multimedia Services, vol. 3: Project P610 Methodologies and case study service selection criteria for management of multimedia services, Feb. 1997.
Hara, Yoshiko. "Japan to begin DTV broadcasts in December", EETimes. 2003. 4. 18. <http://www.eetimes.com/story/OEG2003041850042>.
Jones, J. "Projecting the Television Audience in the Digital Future", Vienna, Austria. 1998. <http://www.cpb.org/library/presentations/esomar.html>.
Mitchell, N, "Trimedia White Paper: A Programmable Architecture for Digital Television", 1998 National Association of Broadcasters Convention, Las Vegas NV, Apr. 9, 1998.
Othman, S.Y., "White Paper: Interactive Data Services for Television, System Design Issues". <http://www.teralogic-inc.com/products/internettv/WhitePaper1/html>. Mar. 1998.
Vedro, S., "Beyond the VBI-High Speed Datacasting and Enhanced TV", info.p@ckets, No. 32, Dec. 1997. <http://www.cpb.org/library/infopackets/packet32.html>.
Yang Sung-Jin, "Samsung. Lg Plan digital TV as new cas cow," The Korea Herald, Apr. 21, 2003. www.koreaherald.co.kr/servlot/cms.articleview.
David Searchrist, "Videoconferencing software is the next best thing to being here," http://www.byte.com/art/9709/sec10/art1.htm, Sep. 1997, 9 pgs.
http://en.wikipedia.org/wiki/Broadband.
http://www.blizzard.com/us/diablo/.
http://eu.blizzard.com/en/press/10-years-diablo.html.
http://www.replacementdocs.com/download.php?view.2101.
http://us.blizzard.com/support/article.xml?articleId=20805&categoryId=2652&parentCategoryId=&pageNumber=1.
http://en.wikipedia.org/wiki/Battle.net.
http://www.uninformed.org/?v=2.
http://www.uninformed.org/?v=2&a=1&t=pdf.
http://us.blizzard.com/support/article.xml?articleId=21119.
http://en.wikipedia.org/wiki/Meridian_59.
http://meridian59.neardeathstudios.com/M59-About-Excellence.shtml.
http://meridian59.neardeathstudios.com/M59-About-NewToGames.shtml.
http://billing.neardeathstudios.com/M59-Billing-FAQ-01.shtml.
http://en.wikipedia.org/wiki/Ultima_Online.
http://guide.uo.com/miscellaneous_0.html.
http://guide.uo.com/start3d_16.html.
http://www.uo.com/billingmanual.html.
U.S. Appl. No. 11/586,260, filed Oct. 24, 2006, Fernandez, Dennis.
U.S. Appl. No. 11/645,978, filed Dec. 26, 2006, Fernandez, Dennis.
U.S. Appl. No. 12/112,377, filed Apr. 30, 2008, Fernandez, Dennis.
U.S. Appl. No. 12/239,633, filed Sep. 26, 2008, Fernandez, Dennis.
U.S. Appl. No. 12/353,776, filed Jan. 14, 2009, Fernandez, Dennis.
U.S. Appl. No. 11/353,694, filed Jan. 14, 2009, Fernandez, Dennis.
U.S. Appl. No. 09/903,973, filed Oct. 24, 2002, Schrader et al.
U.S. Appl. No. 09/992,848, filed Jun. 27, 2002, Feierbach, Wolfgang.
U.S. Appl. No. 10/685,354, filed Apr. 14, 2005, Chen, Michael.
U.S. Appl. No. 12/541,034, filed Aug. 13, 2009, Fernandez et al.
Jay, Frank (ed.). "Simulation," IEEE Standard Dictionary of Electrical and Electronics Terms, 1998, p. 902, 4th Edition Std 100-1988, ANSI/IEEE.

* cited by examiner

United States Patent US 7,917,937 B1

DIGITAL TELEVISION WITH SUBSCRIBER CONFERENCE OVERLAY

CROSS-REFERENCE TO RELATED APPLICATION

This application is a continuation of U.S. patent application Ser. No. 11/514,647, filed originally on Sep. 1, 2006, which is a continuation on the U.S. patent application Ser. No. 11/507,963 filed originally on Aug. 21, 2006, which is a continuation of the U.S. patent application Ser. No. 11/059,611 filed originally on Feb. 15, 2005 now U.S. Pat. No. 7,355,621, which is a continuation of the U.S. patent application Ser. No. 10/444,261 filed originally on May 22, 2003 now U.S. Pat. No. 7,221,387, which is a continuation of the U.S. patent application Ser. No. 10/026,095 filed on Dec. 21, 2001, now issued as U.S. Pat. No. 6,590,602, which is a divisional of the U.S. patent application Ser. No. 09/095,390 filed originally on Jun. 10, 1998, now issued as U.S. Pat. No. 6,339,842; hence this preliminary amendment cancels claims and adds new claims.

FIELD OF INVENTION

The invention relates to digital television systems, particularly to subscriber video conferencing with conventional programming.

BACKGROUND OF INVENTION

Digital television (DTV) attributes have been standardized by industry (e.g., Advanced Television Systems Committee (ATSC) and government (U.S. Federal Communications Commission (FCC)). Such DTV standards, which provide enhanced multimedia quality, as well as interactive data services, are hereby incorporated by reference. Generally, however, DTV specifications contemplate program delivery to various receiver units, but not necessarily communication between receiver units. Accordingly, there may be need for conferencing between units receiving digital system programming.

SUMMARY OF INVENTION

The invention resides in digital television system configured for subscriber conference overlay during program delivery. Billing and advertisement may be personalized according to actual program viewing and/or conferencing activity by DTV receiver. Receiver unit includes media input/output device for multi-user conferencing. Subscribers may be added or removed during programming.

DETAILED DESCRIPTION

Figure 1:
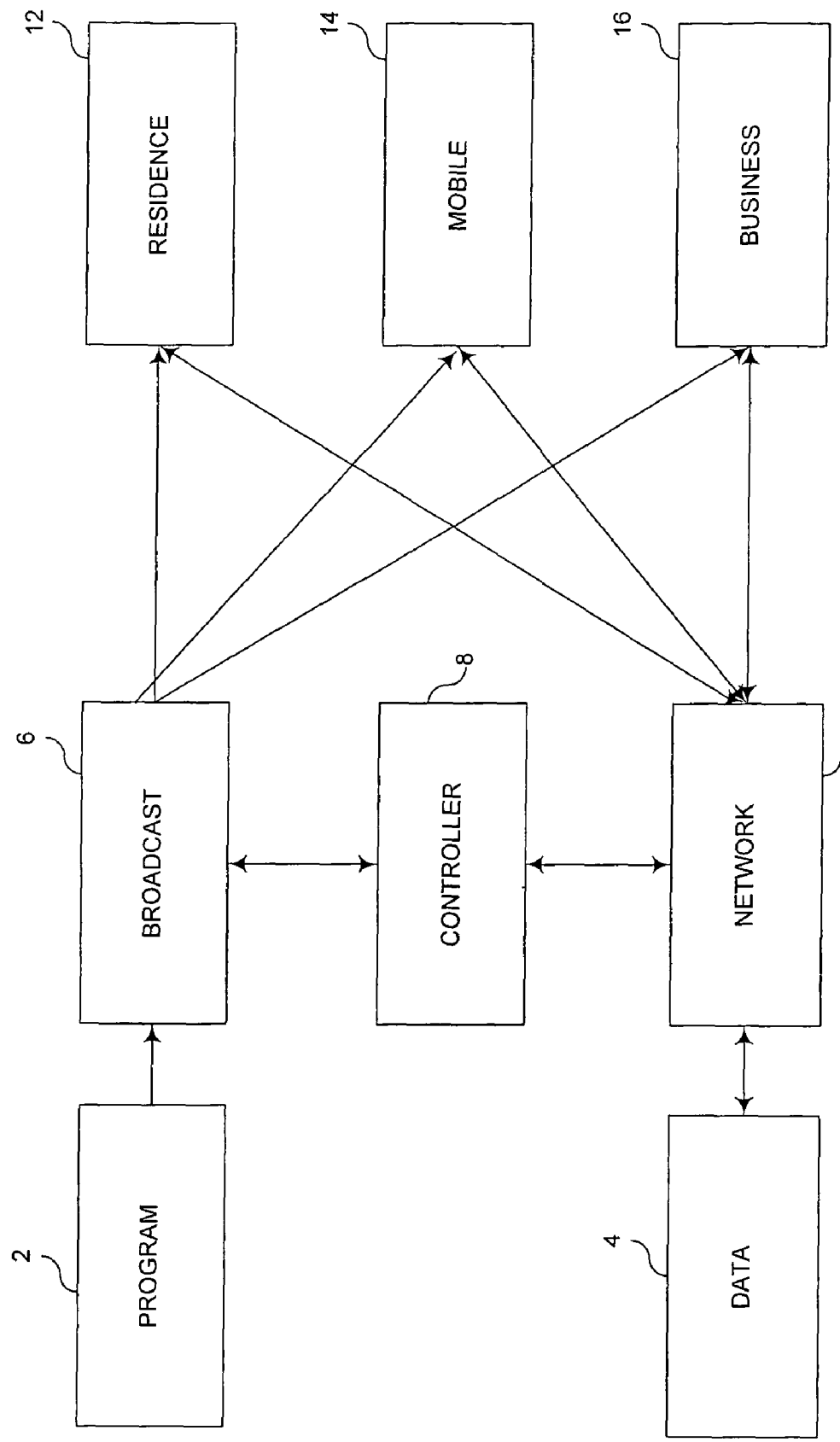
FIG. 1 is block diagram of integrated digital television program and data delivery system for enabling present invention.

FIG. 1 is block diagram of integrated digital television program and data delivery system, including one or more residential 12, mobile 14 and business 16 subscriber, receiver and/or digital television (DTV) units coupled over broadcast 6 and/or network 10 channels respectively to program 2 and/or data 4 sources. Controller 8, which is one or more processor, server, computer or other functionally equivalent controller functionality coupled to broadcast 6 and/or network 10 channel, may affect network 10 and broadcast 6 functionality as described herein.

Program source 2 comprises one or more source for broadcasting one or more video and/or data programs, or other functionally equivalent information signal stream, according to conventional digital and/or analog program broadcasting, accessible or addressable publicly or privately over various broadcast 6 equipment, medium, or other functionally equivalent channels, such as cable, optical fiber, microwave, wireless radio frequency (RF) transmission, direct broadcast satellite (DBS), multichannel multipoint distribution system (MMDS), local multipoint distribution service (LMDS), etc. For example, program 2 may comprise live sports or entertainment performance event, such as professional football game, broadcast over restricted pay-per-view television channels.

Data source 2 comprises one or more source for providing two-way or interactive access to one or more database, file, directory, or other functionally equivalent data repository site or signal source, accessible or addressable publicly or privately over conventional network 10, such as local or wide area network, world-wide web Internet/intranet, or combination thereof, including, for example, network switch, router, bridge, gateway, hub, or other wired and/or wireless networking connection equipment for enabling ISDN, SONET, ATM, frame relay, gigabit Ethernet, TCP/IP, virtual private networks, xDSL, or other similar functionality. Additionally, data 2 may comprise text, graphics, video, or other digital or media information, such as current news update, photographic images, video or audio clips, sports statistics or analysis, stock quotes or financial data, weather forecast report, research data, commercial transaction details, product pricing, etc.

In accordance with important aspect of present invention, digital television system includes multiple receivers coupled selectively or programmably to program 2 and/or data 4 source over broadcast 6 and/or network 10 communications infrastructure, wherein conferencing or communication among DTV subscribers 18 occurs during program and/or data delivery. Consequently, controller 8 may send or transmit service bill indication to participating DTV units per actual program view or conference usage. As used herein, term "conference" or "conferencing" is interpreted broadly and understood to mean any communication between multiple parties.

Additionally, controller may facilitate electronic narrowcast delivery of personalized or customized commercial and/or non-commercial message to select DTV units. Controller 8 and/or subscribers 18 may employ one or more intelligent agents or functionally equivalent software constructs to search, obtain, or transact certain information or activity across network 10. Controller 8 or subscriber unit 18 processor may selectively restrict or censor pre-defined program or data classes or titles, for example, to content screening criteria and/or procedure provided for so-called V-chip specifications. Preferably, each DTV receiver includes searchable and/or identifiable address and various multimedia input/output device capability for enabling video conferencing. Moreover, DTV units may be added or removed during conference period.

Figure 2:
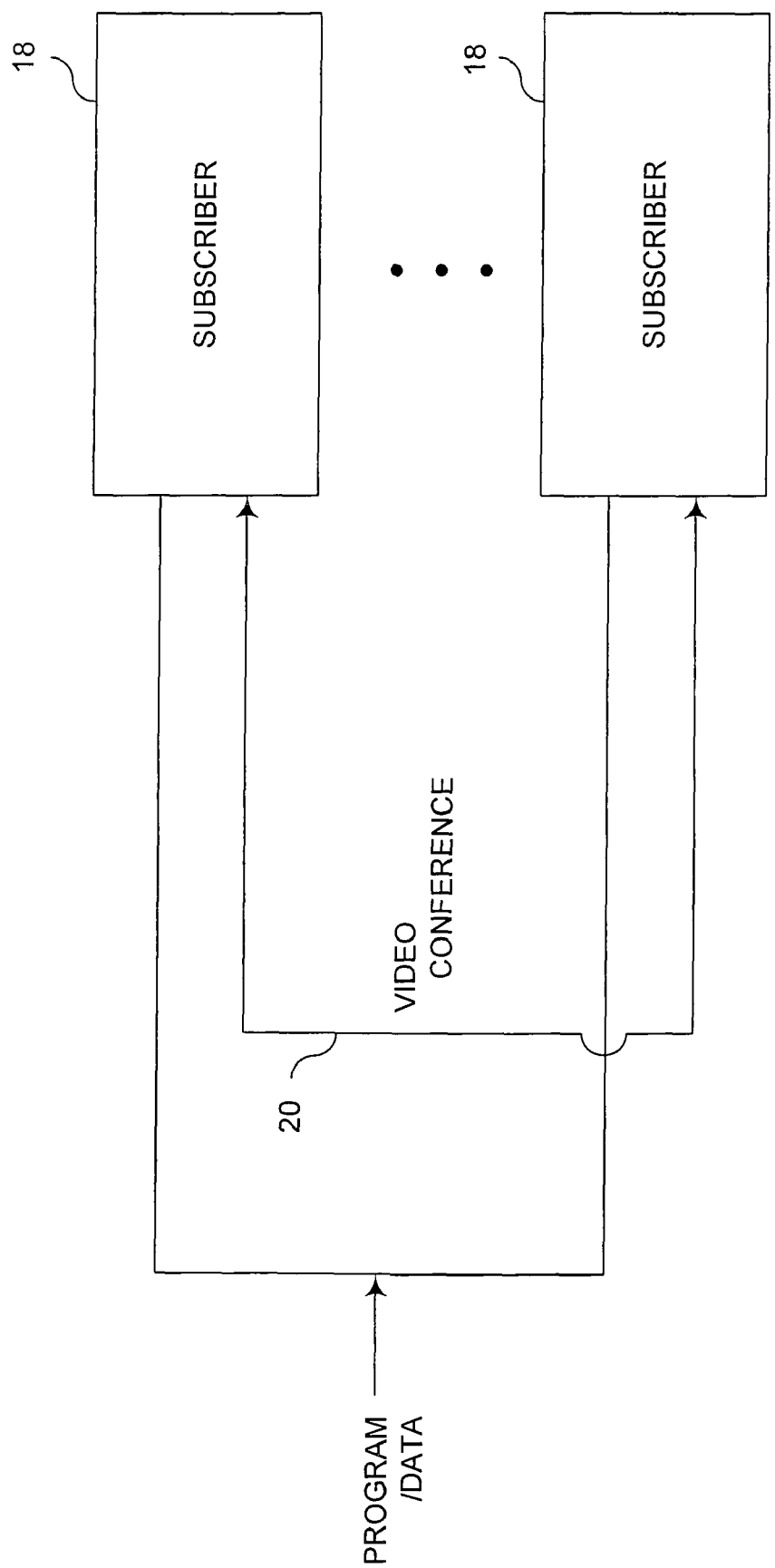
FIG. 2 is simplified diagram of novel overlay of subscriber conferencing over program and/or data delivery.

Accordingly, FIG. 2 shows overlay of subscriber conferencing 20 over program and/or data delivery to subscribers 18. In this networked configuration, controller 8 effectively serves as broadband system headend processor for generating, forwarding, modifying, storing, accessing or otherwise controlling program/data delivery to subscribers 18, while generating, forwarding, modifying, storing, accessing or otherwise controlling video conferencing signal transmission between subscribers 18.

Preferably, such program/data signal generated, transmitted or otherwise processed to receiver units comply with established DTV standards, such as ATSC or other generally accepted industry DTV information or signal format and/or protocol interface, and video conferencing signal generated, transmitted or otherwise processed between receiver units comply with established video conferencing standards, such as H.323, H.324, H.320, T.120 or other generally accepted industry video/data conferencing information or signal format and/or protocol interface, such currently published or online-accessible standards being hereby incorporated by reference.

Figure 3:
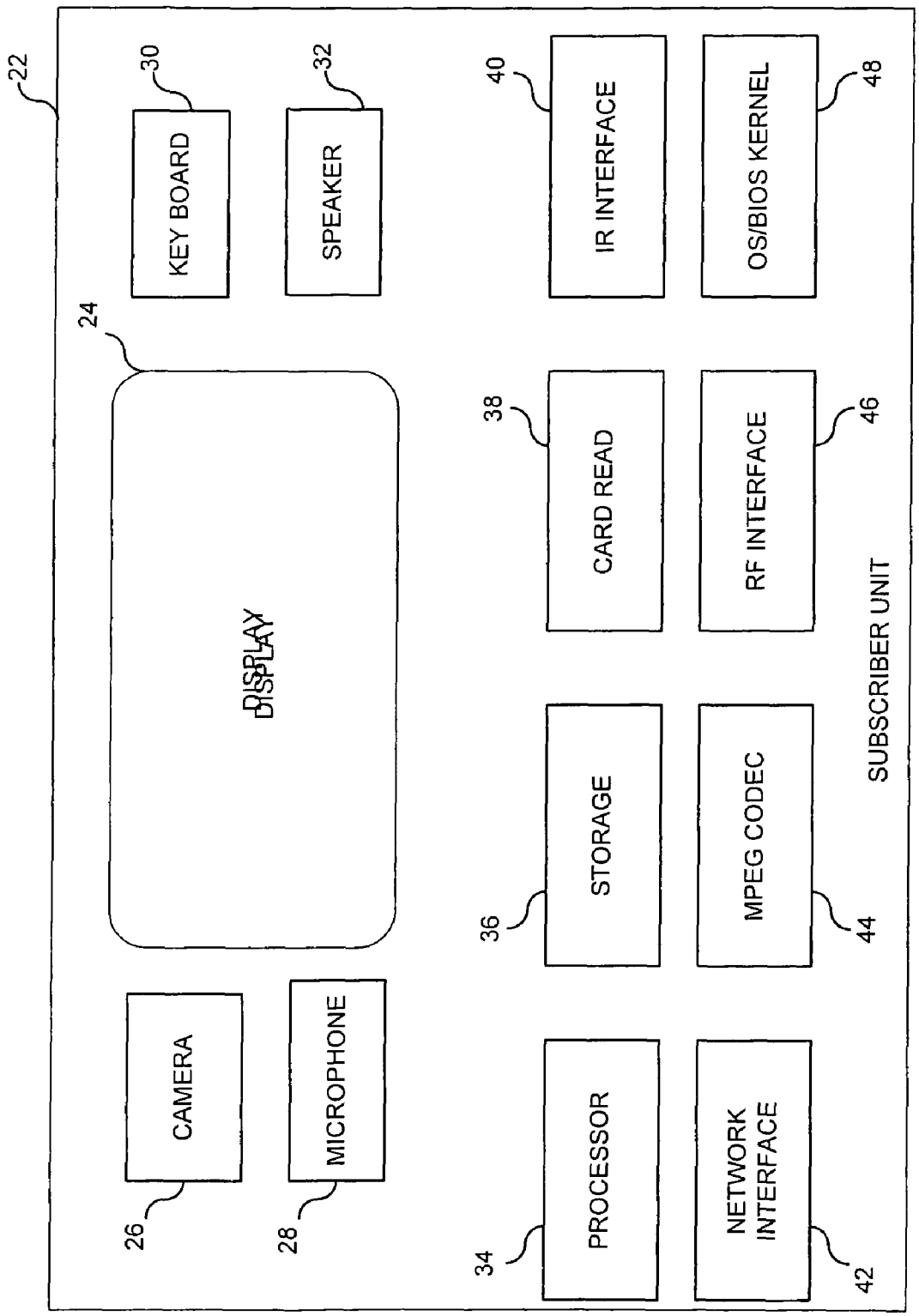
FIG. 3 is representative digital TV subscriber unit used according to present invention.

FIG. 3 shows digital television subscriber unit 22, which may be implemented as one or more DTV receivers 12, 14, or 16 of FIG. 1. Preferably, DTV unit 22, which functions in compliance with Advanced Television Systems Committee (ATSC) standard for DTV equipment and system operation, substantially includes display panel or screen with video frame buffer 24, digital video-conferencing camera or image sensor 26, microphone 28, keyboard and/or mouse 30, speaker(s) 32, processor or controller 34, digital memory or recordable video disk storage 36, peripheral card reader 38, remote control infrared interface 40, network interface or modem 42 (e.g., for coupling to network channel 10), digital compressed video encoder/decoder (i.e., according to Moving Pictures Experts Group (MPEG) industry standards)), radio frequency (RF), broadband or wireless communications interface 46 (e.g., for coupling to broadcast channel 6), and operating system, BIOS, browser, or other associated kernel software 48 for generally enabling system and controller 34 operation and network communications.

It is contemplated that ATSC-compliant DTV unit 22 may be embodied as well in personal or network computer, workstation, set-top television device, or functionally equivalent processing and associated network equipment, as configured to operate as specified herein according to present invention.

Moreover, controllers 8, 34 execute one or more computer programs for performing functions as described herein, preferably according to embedded or real-time software syntax, such as JAVA and/or Windows CE, which currently published or on-line specifications are hereby incorporated by reference.

Figure 4:
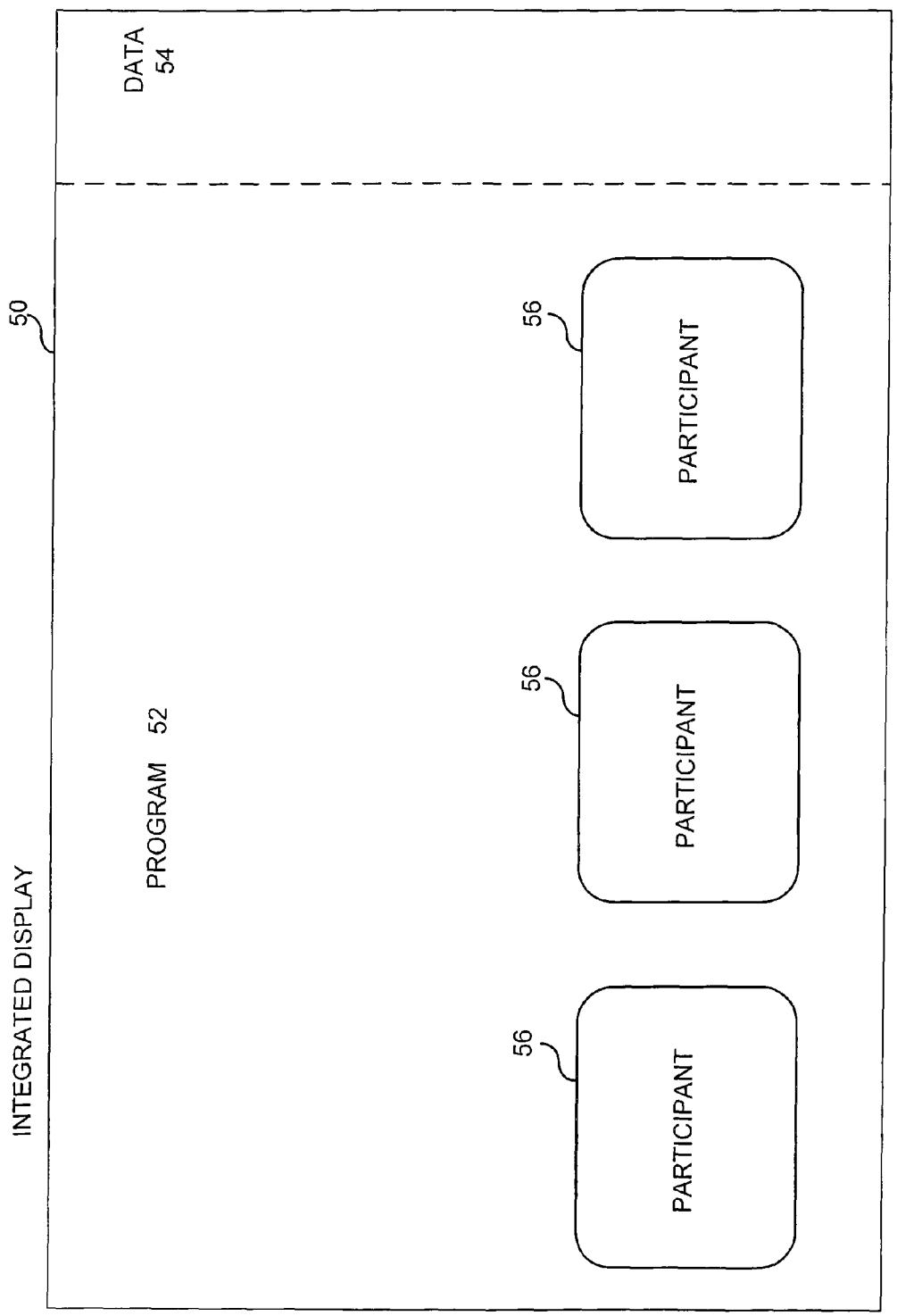
FIG. 4 is sample digital TV display according to present invention.

When DTV unit 22 operates according to present invention, sample display 24 screen output may be as represented in FIG. 4. In particular, display 24 may integrate, combine, mix, or otherwise include program 52 and/or data 54, effectively through video frame buffer, with video conferencing windows from current (i.e., self) and/or other DTV participants 56 coupled thereto, preferably during program/data delivery. For example, each screen element 52, 54, 56 may be shown as picture within or adjacent to another picture element. In this overlaid manner, each DTV unit in select set displays common program and/or data stream, as well as conference video and audio signal output as generated from video camera and microphone from other participant DTV units.

Preferably, such program and/or video signals are compressed and encoded according to industry standard such as MPEG format. Display 50 may also show whiteboard-type screen commonly among participants 56 for jointly communicating text, graphics, or other observable or audible program or data, such as for workgroup or class collaboration to review or discuss draft documents, faxes, or other forms or files.

Figure 5:
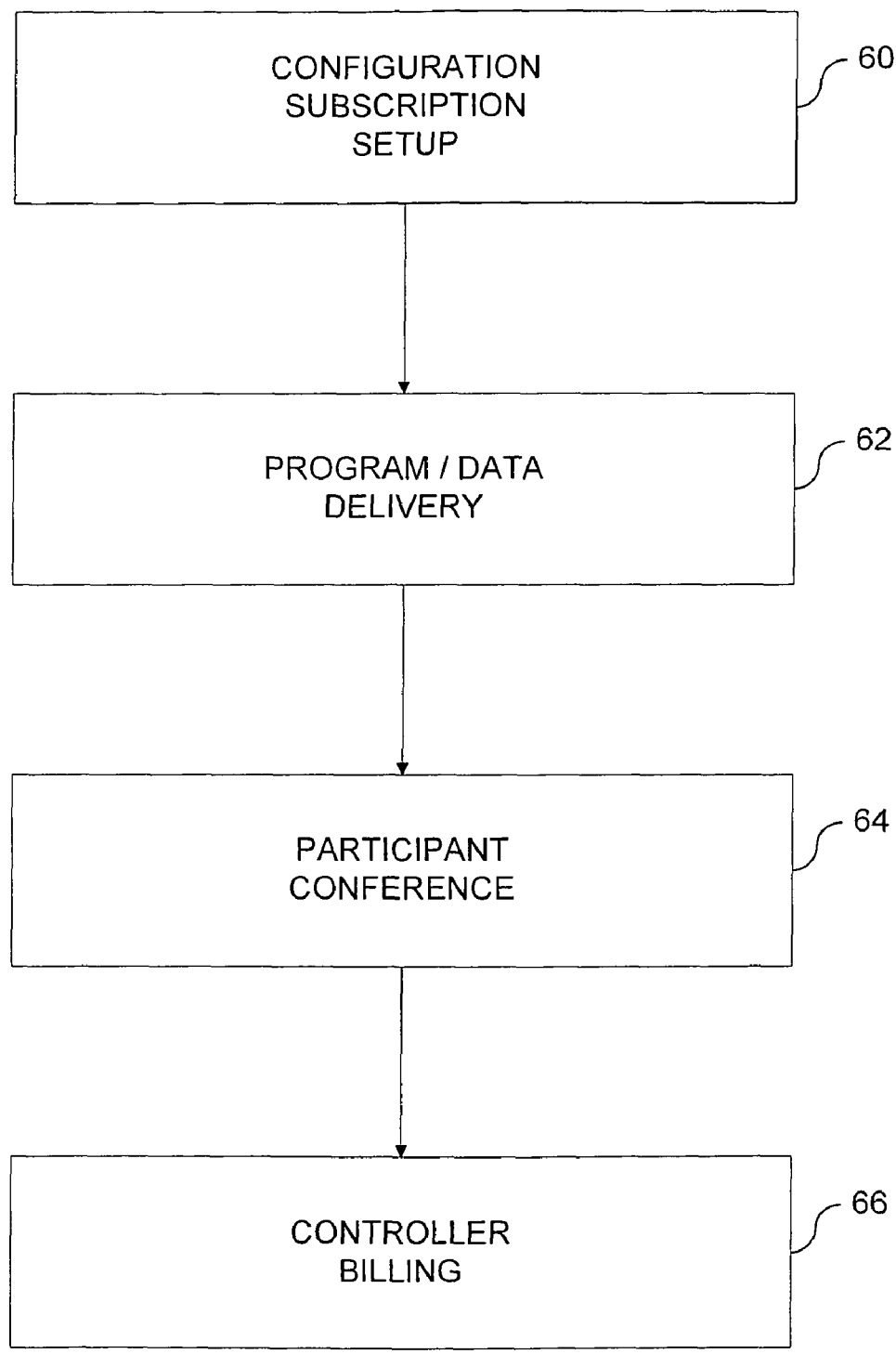
FIG. 5 is flow chart of operational steps of present invention.

FIG. 5 shows operational flow chart, including steps for system configuration and subscription set-up 60, program and/or data delivery 62, participant conference 64, and controller billing 66. Preferably, controller 8, serves as central processor to coordinate DTV unit set-up, user smart-card account authorization or identity authentication program/data and/or conference scheduling, programming, viewing, output formatting, conference access and communication, billing, advertising, and other associated activity, particularly for managing access to program 2, data 4, as well as DTV video conferencing signals 20. To reduce latency, controller 8 may transmit static image instead of live video.

For example, controller 8 may authorize or cause certain DTV units to be added or removed dynamically from one or more video conferencing active set or selected logical group, as well as restrict select DTV unit(s) from viewing certain program and/or data. Moreover, controller 8 monitors one or more actual program/data viewing and/or conferencing usage for appropriate billing. Furthermore, controller 8 may direct personalized or targeted commercial, incentive, or advertising messages to certain recognized demographic interest group, DTV subscribers or participant video conferencing parties.

Preferably, controller 8 directs such messages dynamically or adaptively according to current subscriber or participant information activity or needs, as well as product availability, market pricing, or other commercial attribute. Additionally, controller 8 may take corrective action or functional adjustment to redirect, restrict, control, or otherwise manage network, program/data, or other system resources, upon detecting actual or possible performance bottlenecks or other equipment or connection fault causing undesirable impact on such information delivery.

In one embodiment of present invention, DTV system is configured for luxury-suite type or other effectively exclusive membership multi-user conferenced viewing of live sports event, such that professional football, basketball, baseball, hockey, soccer, or other competitive individual, team, or tournament telecast is provided as program 2 through broadcast channel 6, including preferably statistical or background data 4 about player, team, or other related game aspect. In particular, controller 8 provides proper access by authorized DTV subscribers 18 to such sports program and/or data. Additionally, controller 8 coordinates or monitors video conferencing activity occurring directly or indirectly between DTV units watching common program/data stream.

Hence, for example, initially, during configuration subscription setup phase 60, system or headend controller 8 begins to identify system configuration, network address, program order and account status of any subscriber units coupled thereto over broadcast 6 and/or network 10 channels. Commercial transaction may occur to define DTV receiver unit user subscriptions, particularly for authenticating, billing, scheduling, notifying, requesting or otherwise providing desired access to any upcoming or current program 2 or database 4. As appropriate, controller 8 may conduct remote diagnostics over such channels to various units 12, 14, 16 to ensure proper functioning for signal delivery.

Next, program and/or data delivery may commence according to controller 8 programmable selection to enable digital transmission for electronic signal delivery 62 of certain program 2 and/or data 4 for presentation in integrated display 50 of selected or addressed DTV subscriber units 18. Then, thereafter, prior, or simultaneously, select participants 56 are enabled for video conferencing 20, particularly by allowing such participants to be monitored by activated video camera 26 and/or microphone 28, for transmission of monitored static image or live motion video compressed encoded digital signal for presentation in display screen 50. Upon completion of program/data delivery and conferencing activity, controller 8 may send proper billing indications to participant DTV units. Controller 8 may appropriately add or delete subscriber 18 in active database.

Therefore, in this combined DTV program/data viewing and select viewer conferencing scheme, important objective of emulating luxury-suite or otherwise more collaborative, intimate or personal conditions among associated audience members located at different locations is achieved effectively.

Optionally, while receiving program/data, conferenced subscriber may also send or receive electronic text message to other subscribers or other mail account addressable through network 10, or run various application programs locally or in distributed client-server networked manner, preferably in common with other conferenced DTV units, such as for multi-user simulation or gaming application.

To improve system program/data broadcast or video conferencing performance, for example, when restricted effectively by channel bandwidth or traffic congestion, controllers 8, 34 may reduce or eliminate actual transmission of full content video signal, and preferably transmit information subset, such as static image, text and/or voice.

Foregoing described embodiments of invention are provided as illustration and description. It is not intended to limit invention to precise form described. Other variations and embodiments are possible in light of above teaching, and it is thus intended that scope of invention not be limited by detailed description, but rather by claims as follow.

We claim:

1. Method for combined interactive data services comprising steps:

configuring a controller to enable broadband service to one or more subscriber receivers authorized for combined conferencing, digital television and multi-user virtually simulated gaming services;

delivering or providing access by the controller to a digital television program or multi-user virtually simulated game application to one or more of the authorized receivers; and enabling by the controller a conference between a plurality of authorized receivers during, before, or after the delivery or access;

wherein the controller centrally authorizes the plurality of authorized receivers for integrated digital television program and data delivery as a combined broadband service subscription for each authorized receiver, such that the broadband service combines conferencing, digital television and multi-user virtually simulated gaming as configured centrally by the controller via a commercial transaction that defines digital television receiver unit user subscription, authentication, billing, scheduling, notifying, requesting and access to one or more upcoming or current program or database, thereby centrally enabling such combined broadband service subscription for each receiver unit user conferencing, digital television and multi-user virtually simulated gaming service, wherein the controller authorizes one or more receivers to be added or removed dynamically from one or more video conferencing active set or selected logical group for combined conferencing, digital television and multi-user virtually simulated gaming, and restricts one or more receivers from viewing select program or data for conferencing, digital television or multi-user virtually simulated gaming;

wherein one or more of the subscriber receivers comprises a digital television receiver that functions in compliance with Advanced Television Systems Committee (ATSC) standard enabled to deliver combined broadband services comprising video-conferencing, digital television and multi-user virtually simulated gaming, such ATSC-compliant receiver comprising a display panel or screen with a video frame buffer, a digital video-conferencing camera or image sensor, a microphone, a keyboard or mouse, one or more speakers, a processor, a digital memory or recordable video disk storage, a network interface or modem that couples such ATSC-compliant receiver to a network channel to access combined broadband services comprising video-conferencing, digital television and multi-user virtually simulated gaming, a radio frequency (RF), broadband or wireless communications interface that couples such ATSC-compliant receiver to a broadcast channel to access combined broadband services comprising video-conferencing, digital television and multi-user virtually simulated gaming, and an operating system or BIOS, and an associated kernel software that enables controller or processor operation and network communication of combined broadband services comprising video-conferencing, digital television and multi-user virtually simulated gaming, such ATSC-compliant receiver being embodied in a personal or network computer, a workstation, a set-top television device or functionally equivalent integrated digital television program and data processing and associated network equipment, said controller or processor executing one or more computer program using embedded or real-time software syntax that enables multi-channel access to combined broadband services comprising video-conferencing, digital television and multi-user virtually simulated gaming via said network and broadcast channels, said display panel or screen integrating, combining, mixing, or including via the video frame buffer said combined broadband services program or data with video conferencing among video conferencing participants coupled to such ATSC-compliant receiver during said combined broadband services program or data delivery, such that one or more screen element integrated, combined, mixed or included in the video frame buffer is shown as a picture within or adjacent to another picture element on said display panel or screen, such that in a graphically overlaid manner, such ATSC-compliant receiver displays one or more common integrated digital television program or data and video-conferencing generated from one or more video camera or image sensor and microphone from other participant ATSC-compliant receiver.

2. Method of claim 1 wherein:
the controller comprises a network headend or switch coupled via optical fiber or cable for delivering or accessing the digital television program or game application.

3. Method of claim 1 wherein:
at least one of the authorized receivers comprises a mobile unit having a radio-frequency interface for communicating wirelessly with the controller.

4. Method of claim 1 wherein:
at least one of the authorized receivers comprises a digital video disk recorder for storing an advertisement delivered or accessed with the digital television program or game application.

5. Method of claim 1 wherein:
at least one of the authorized receivers displays the digital television program or game application and a screen element representing a conferencing receiver.

6. Method of claim 1 wherein:
the conference comprises a video-conference between a plurality of authorized receivers during a delivered or accessed live sports broadcast.

7. Controller for combined interactive data services comprising:
means for authorizing broadband service to one or more subscriber receivers for combined conferencing, digital television and multi-user virtually simulated gaming services;
means for delivering or providing access to a digital television program or multi-user virtually simulated game application to one or more of the authorized receivers; and
means for conferencing between a plurality of authorized receivers during, before, or after the delivery or access;
wherein the controller centrally authorizes the plurality of authorized receivers for integrated digital television program and data delivery as a combined broadband service subscription for each authorized receiver, such that the broadband service combines conferencing, digital television and multi-user virtually simulated gaming as configured centrally by the controller via a commercial transaction that defines digital television receiver unit user subscription, authentication, billing, scheduling, notifying, requesting and access to one or more upcoming or current program or database, thereby centrally enabling such combined broadband service subscription for each receiver unit user conferencing, digital television and multi-user virtually simulated gaming service, wherein the controller authorizes one or more receivers to be added or removed dynamically from one or more video conferencing active set or selected logical group for combined conferencing, digital television and multi-user virtually simulated gaming, and restricts one or more receivers from viewing select program or data for conferencing, digital television or multi-user virtually simulated gaming;
wherein one or more of the subscriber receivers comprises a digital television receiver that functions in compliance with Advanced Television Systems Committee (ATSC) standard enabled to deliver combined broadband services comprising video-conferencing, digital television and multi-user virtually simulated gaming, such ATSC-compliant receiver comprising a display panel or screen with a video frame buffer, a digital video-conferencing camera or image sensor, a microphone, a keyboard or mouse, one or more speakers, a processor, a digital memory or recordable video disk storage, a network interface or modem that couples such ATSC-compliant receiver to a network channel to access combined broadband services comprising video-conferencing, digital television and multi-user virtually simulated gaming, a radio frequency (RF), broadband or wireless communications interface that couples such ATSC-compliant receiver to a broadcast channel to access combined broadband services comprising video-conferencing, digital television and multi-user virtually simulated gaming, and an operating system or BIOS, and an associated kernel software that enables controller or processor operation and network communication of combined broadband services comprising video-conferencing, digital television and multi-user virtually simulated gaming, such ATSC-compliant receiver being embodied in a personal or network computer, a workstation, a set-top television device or functionally equivalent integrated digital television program and data processing and associated network equipment, said controller or processor executing one or more computer program using embedded or real-time software syntax that enables multi-channel access to combined broadband services comprising video-conferencing, digital television and multi-user virtually simulated gaming via said network and broadcast channels, said display panel or screen integrating, combining, mixing, or including via the video frame buffer said combined broadband services program or data with video conferencing among video conferencing participants coupled to such ATSC-compliant receiver during said combined broadband services program or data delivery, such that one or more screen element integrated, combined, mixed or included in the video frame buffer is shown as a picture within or adjacent to another picture element on said display panel or screen, such that in a graphically overlaid manner, such ATSC-compliant receiver displays one or more common integrated digital television program or data and video-conferencing generated from one or more video camera or image sensor and microphone from other participant ATSC-compliant receiver.

8. Controller of claim 7 wherein:
the digital television or game application is delivered or accessed via a network headend, router or switch coupled via optical fiber or cable.

9. Controller of claim 7 wherein:
at least one of the authorized receivers comprises a mobile unit having a radio-frequency interface for wireless or satellite communication.

10. Controller of claim 7 wherein:
at least one of the authorized receivers comprises a digital video disk recorder for storing a personalized message or targeted narrowcast incentive delivered or accessed during, before or after the digital television program or game application.

11. Controller of claim 7 wherein:
at least one of the authorized receivers overlays the digital television program or game application with a display element associated with an authorized receiver.

12. Controller of claim 7 wherein:
an audio or video-conference is enabled for emulating a sports event luxury suite among a plurality of authorized receivers during a delivered or accessed sports live-broadcast or simulated-game.

13. Receiver for combined interactive data services comprising:
a processor for receiving or accessing combined broadband services authorized for conferencing, television broadcast and virtually simulated gaming services, such processor receiving or accessing a television program or virtually simulated game application, and conferencing with another receiver during, before or after the receipt or access;
wherein a controller centrally authorizes the plurality of authorized receivers for integrated digital television program and data delivery as a combined broadband service subscription for each authorized receiver, such that the broadband service combines conferencing, digital television and multi-user virtually simulated gaming as configured centrally by the controller via a commercial transaction that defines digital television receiver unit user subscription, authentication, billing, scheduling, notifying, requesting and access to one or more upcoming or current program or database, thereby centrally enabling such combined broadband service subscription for each receiver unit user conferencing, digital television and multi-user virtually simulated gaming service, wherein the controller authorizes one or more receivers to be added or removed dynamically from one or more video conferencing active set or selected logical group for combined conferencing, digital television and multi-user virtually simulated gaming, and restricts one or more receivers from viewing select program or data for conferencing, digital television or multi-user virtually simulated gaming;

wherein one or more of the subscriber receivers comprises a digital television receiver that functions in compliance with Advanced Television Systems Committee (ATSC) standard enabled to deliver combined broadband services comprising video-conferencing, digital television and multi-user virtually simulated gaming, such ATSC-compliant receiver comprising a display panel or screen with a video frame buffer, a digital video-conferencing camera or image sensor, a microphone, a keyboard or mouse, one or more speakers, a processor, a digital memory or recordable video disk storage, a network interface or modem that couples such ATSC-compliant receiver to a network channel to access combined broadband services comprising video-conferencing, digital television and multi-user virtually simulated gaming, a radio frequency (RF), broadband or wireless communications interface that couples such ATSC-compliant receiver to a broadcast channel to access combined broadband services comprising video-conferencing, digital television and multi-user virtually simulated gaming, and an operating system or BIOS, and an associated kernel software that enables controller or processor operation and network communication of combined broadband services comprising video-conferencing, digital television and multi-user virtually simulated gaming, such ATSC-compliant receiver being embodied in a personal or network computer, a workstation, a set-top television device or functionally equivalent integrated digital television program and data processing and associated network equipment, said controller or processor executing one or more computer program using embedded or real-time software syntax that enables multi-channel access to combined broadband services comprising video-conferencing, digital television and multi-user virtually simulated gaming via said network and broadcast channels, said display panel or screen integrating, combining, mixing, or including via the video frame buffer said combined broadband services program or data with video conferencing among video conferencing participants coupled to such ATSC-compliant receiver during said combined broadband services program or data delivery, such that one or more screen element integrated, combined, mixed or included in the video frame buffer is shown as a picture within or adjacent to another picture element on said display panel or screen, such that in a graphically overlaid manner, such ATSC-compliant receiver displays one or more common integrated digital television program or data and video-conferencing generated from one or more video camera or image sensor and microphone from other participant ATSC-compliant receiver.

14. Receiver of claim 13 wherein:
the television or game application is received or accessed via an optical or gigabit Ethernet signal.

15. Receiver of claim 13 wherein:
the processor receives or accesses service using a wireless interface.

16. Receiver of claim 13 wherein:
the processor stores in a video recorder a commercial message or personalized advertisement included in the television program or game application.

17. Receiver of claim 13 wherein:
at least one of the authorized receivers overlays the television program or game application with a display element associated with an authorized receiver.

18. Receiver of claim 13 wherein:
the conference emulates a luxury suite during, before or after a received or accessed live-broadcast or simulated-game.

\* \* \* \* \*